United States Patent
Ceria

(10) Patent No.: US 7,089,706 B2
(45) Date of Patent: Aug. 15, 2006

(54) COVERING COMPONENT FOR PROTECTING OUTER SURFACES OF BUILDINGS FROM ATMOSPHERIC AGENTS, INCORPORATING HEAT EXCHANGER MEANS, AND SYSTEM FOR THE EXTERNAL COVERING OF BUILDINGS USING SUCH A COMPONENT

(75) Inventor: Edilberto Ceria, Turin (IT)

(73) Assignee: Isolpack S.p.A., Turin (IT)

( * ) Notice: Subject to any disclaimer, the term of this patent is extended or adjusted under 35 U.S.C. 154(b) by 41 days.

(21) Appl. No.: 10/460,251

(22) Filed: Jun. 13, 2003

(65) Prior Publication Data
US 2004/0074153 A1   Apr. 22, 2004

(30) Foreign Application Priority Data
Jun. 14, 2002  (IT)  .......................... TO2002A0507

(51) Int. Cl.
*E04D 13/18*   (2006.01)
*F24J 2/00*   (2006.01)

(52) U.S. Cl. ...................... 52/173.3; 165/168; 126/621

(58) Field of Classification Search ............... 52/173.3, 52/309.9, 794.7, 783.11; 165/168, 170; 126/633, 126/634, 621, 623, 651, 709
See application file for complete search history.

(56) References Cited

U.S. PATENT DOCUMENTS

| | | | | |
|---|---|---|---|---|
| 1,800,150 A | * | 4/1931 | Musgrave et al. ............ | 165/56 |
| 3,029,172 A | * | 4/1962 | Glass ....................... | 428/316.6 |
| 3,290,845 A | * | 12/1966 | Snyder ....................... | 52/478 |
| 3,555,756 A | * | 1/1971 | Curran et al. ............... | 52/309.9 |
| 4,011,856 A | * | 3/1977 | Gallagher ................... | 126/659 |
| 4,074,706 A | * | 2/1978 | Hajdu et al. ................. | 126/661 |
| 4,192,287 A | * | 3/1980 | James ......................... | 126/675 |
| 4,194,491 A | * | 3/1980 | Randall ....................... | 126/711 |
| 4,213,449 A | * | 7/1980 | Roth et al. ................... | 126/660 |
| 4,227,515 A | * | 10/1980 | Jacob et al. ................. | 126/592 |
| 4,233,962 A | * | 11/1980 | Neny .......................... | 126/662 |
| 4,245,620 A | * | 1/1981 | Heinemann .................. | 126/662 |
| 4,257,398 A | * | 3/1981 | Watson ....................... | 126/612 |
| 4,338,921 A | * | 7/1982 | Harder et al. ............... | 126/659 |
| 4,366,793 A | * | 1/1983 | Coles ......................... | 123/436 |

(Continued)

FOREIGN PATENT DOCUMENTS

| | | |
|---|---|---|
| CH | 619 770 | 10/1980 |
| DE | 28 16 970 | 10/1979 |
| JP | 59-167648 | * 9/1984 |
| JP | 6-264527 | * 9/1994 |

*Primary Examiner*—Robert Canfield
(74) *Attorney, Agent, or Firm*—Sughrue Mion, PLLC

(57) ABSTRACT

A covering component for protecting outer surfaces of buildings from atmospheric agents comprises a metal sheet (7), an insulating mass (8) arranged below said sheet (7), and heat exchanging means (7–9, 11, 12) comprising at least a passage channel (7B), the latter being an integral part of the component and being designed to be part of a solar energy heating system for a heat conveying fluid. The passage channel consists of a rib (7B) of the sheet (7) defining a cross section opening towards the insulating mass (8), and the outer surface of the passage channel thus formed is almost completely exposed to sunlight. In the preferred embodiment of the invention there is provided a cover made of transparent material (11), arranged above the sheet (7), which delimits together with the latter at least part of a hollow space (12) into which the rib (12) projects.

33 Claims, 2 Drawing Sheets

U.S. PATENT DOCUMENTS

| | | | | |
|---|---|---|---|---|
| 4,397,305 A | * | 8/1983 | Keefe | 126/665 |
| 4,404,962 A | * | 9/1983 | Zinn et al. | 126/676 |
| 4,517,721 A | * | 5/1985 | Graham | 29/890.038 |
| 4,526,162 A | * | 7/1985 | Arai | 126/709 |
| 4,837,999 A | * | 6/1989 | Stayner | 52/309.11 |
| 6,105,570 A | * | 8/2000 | Chang | 126/655 |

* cited by examiner

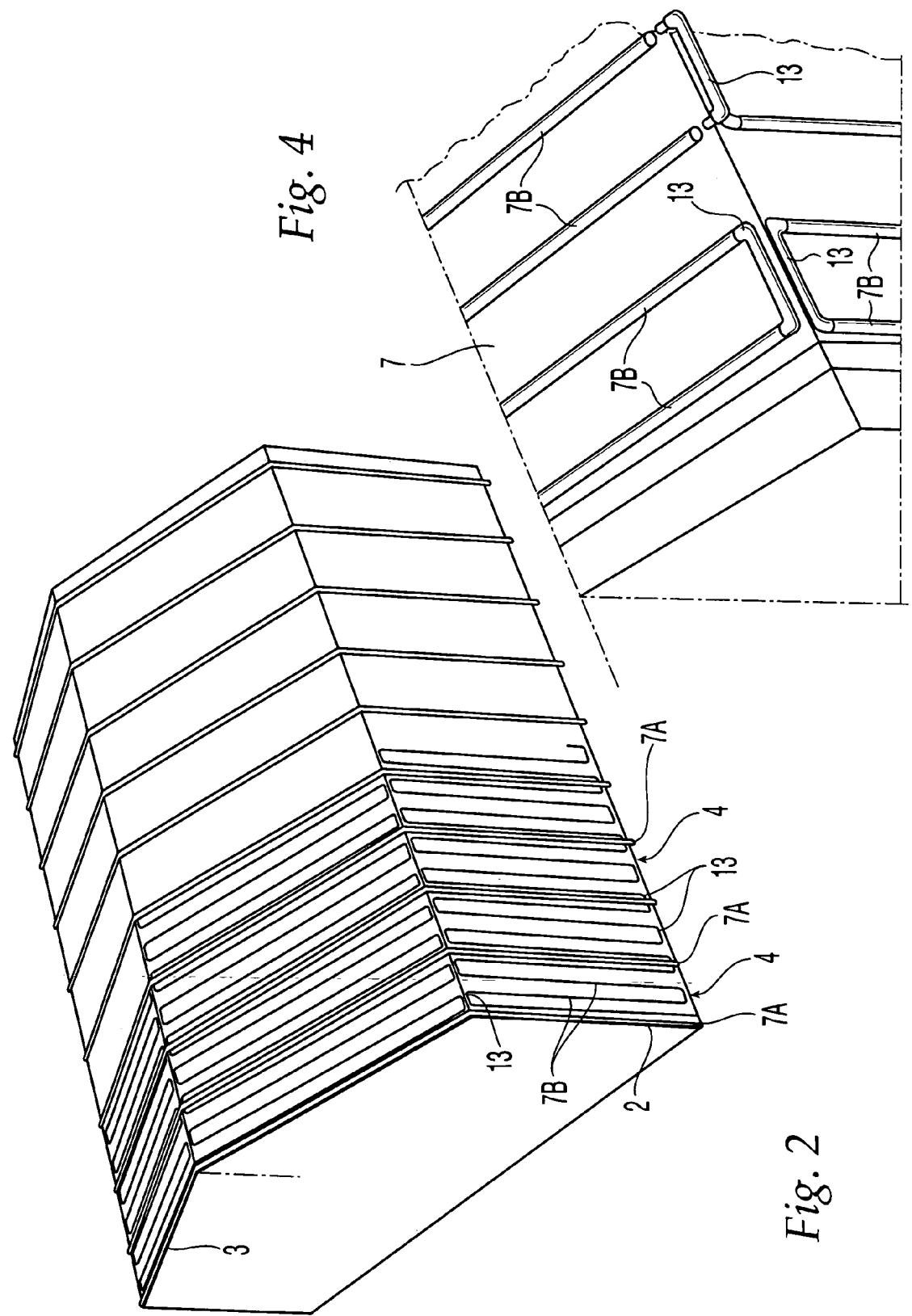

COVERING COMPONENT FOR PROTECTING OUTER SURFACES OF BUILDINGS FROM ATMOSPHERIC AGENTS, INCORPORATING HEAT EXCHANGER MEANS, AND SYSTEM FOR THE EXTERNAL COVERING OF BUILDINGS USING SUCH A COMPONENT

FIELD OF THE INVENTION

The present invention relates to a covering component for protecting outer surfaces of buildings from atmospheric agents, incorporating heat exchanging means, and to a system for the external covering of buildings using such a component.

BACKGROUND OF THE INVENTION

In order to cover lateral surfaces and tops of buildings, coating elements in the form of modular panels are largely used, which should have high features of seal with respect to infiltrations, of thermal insulation and of mechanical resistance. That is why the structure of said panels typically consists of a layer of insulating material, for instance glass wool or polyurethane resin, enclosed in a metal envelope. The panel structure should further enable a good modularity, i.e. possibility of coupling more panels one with the other so as to obtain a continuous covering surface.

In the past it has been suggested to integrated a solar energy heating system for a fluid into a system for coating or covering buildings as referred to above.

In said light, document DE-A-28 16 970 describes panels for the external covering of buildings, comprising a core made of insulating material placed between an upper metal sheet and a lower metal sheet.

The panels described in the document mentioned above are rectangular and secured one beside the other on their respective long sides, the connection line between the panels being parallel with respect to the width of the surface of the building to be covered.

The upper metal sheet is covered by a further outer metal sheet, the two sheets being joined by welding, brazing or gluing; at least one of the two sheets has a series of ribs, so that the connection of said sheets results in a plurality of channels for a heat conveying fluid.

To this purpose, in particular there are provided for:
a series of first channels extending parallel one to the other and with respect to the long sides of the panel, and therefore parallel with respect to the width of the building surface to be covered,
two manifold channels, parallel one to the other and with respect to the short sides of the panel, therefore extending perpendicularly with respect to the first channels.

The first channels communicate with the manifold channels, which are arranged each close to a respective short side of the panel. The end area of each manifold channel, on the upper surface of said channels, comprises holes for corresponding outer connections, connecting the manifold channels of a panel to the manifold channels of an adjacent panel, thus forming a system for the circulation of the heat conveying fluid.

The solution referred to in DE-A-28 16 970 is highly expensive as far as panel manufacturing is concerned, which envisages on one side the manufacturing of the upper portion of said panel through two metal sheets coupled one with the other, so as to form the various channels; in the embodiment described above, furthermore, a substantial part of the outer surface of the channels is not visible, i.e. it is not exposed directly to sun rays, which limits the possibility of heating the fluid by direct sun irradiation.

On the other side, also the installation of the covering system referred to in the prior document mentioned above is complex and expensive, since it envisages the use of a large number of panels and outer connections, the latter being also critical points as far as the hydraulic seal of the system is concerned; the same kind of fastening of the connections to the manifold channels, using screws and nuts, further complicates the mounting of the panels and their reciprocal hydraulic connections.

From document CH-A-619 770 it is also known a tile to be used for covering pitch roofs, having a single body made of metal, glass, cement conglomerate, terracotta or synthetic resin, having a flat portion and a curved portion placed side by side in longitudinal direction.

On top of the curved portion there is an outer groove, which can house and keep in position, through a respective pin, a length of dark-colored metal tube through which the fluid to be heated flows; the tile then has a glass cap covering, insulating and protecting said curved portion as well as the tube length supported by said portion. Thus, supposing that the groove is open upwards and the cap is transparent, the tube is exposed directly to sun rays.

The flat portion of the single body of the tile has hollow protuberances projecting upwards, having reflecting outer surfaces such that one of their areas is always placed in an optimal position with respect to sun rays, then reflecting the latter towards the tube whatever the position of the sun. Said protuberances are connected one to the other and to a cavity placed under the curved portion of the tile body, by means of ducts wherein air circulates, thus conveying heat absorbed in the area of the protuberances towards the cavity under the tube, so as to further heat the latter. The aforesaid ducts create in the upper portion of the tile reliefs preventing the longitudinal sliding of the glass cap.

For use, the tiles are nailed onto a heat insulating underground, which is secured in its turn onto a smooth plane resting on the roof load-bearing structure; it is thus possible to carry out a pitch roof, where the longitudinal tile rows house the aforesaid tubes, which extend therefore in a direction substantially perpendicular with respect to the width of the covered surface.

If the solution described in CH-A-619 770 on one side enables to obtain a roof with an aesthetical appearance substantially similar to the one of a common pitch tile roof, on the other it is complex and expensive as far as both tile manufacturing and tile installation are concerned, the latter envisaging also the installation of an underlying heat insulating system; the system described above, which is not suitable for covering vertical walls, further does not enable to obtain a roof structure with substantially monolithic panels, as is the case of DE-A-28 16 970, which is preferable in some applications (such as for instance the covering of industrial, commercial and similar buildings).

SUMMARY OF THE INVENTION

The present invention aims at solving one or more of the drawbacks referred to above.

In said general framework, an aim of the present invention is to indicate covering components for protecting outer surfaces of buildings from atmospheric agents, incorporating heat exchanging means, simple and cheap to be carried out and with an efficient operation.

Another aim of the invention is to indicate a system for the external covering of buildings, based on the use of modular panel components, simple and cheap to be mounted and highly reliable from an operating point of view.

These and other aims are achieved according to the present invention by a covering component for protecting outer surfaces of buildings from atmospheric agents, incorporating heat exchanger means, and by a system for the external covering of building having the characteristics as referred to in the appended claims, which are to be regarded as an integral part of the present description.

BRIEF DESCRIPTION OF THE DRAWINGS

Further aims, characteristics and advantages of the present invention will be evident from the following detailed description and from the accompanying drawings, provided as a mere illustrating and non-limiting example, in which:

FIG. 2 is a schematic perspective view of the building of FIG. 1;

FIG. 4 is a partial and schematic perspective view of a possible embodiment of a system for the hydraulic connection of several covering panels according to the invention;

DETAILED DESCRIPTION OF THE INVENTION

Figure 1:
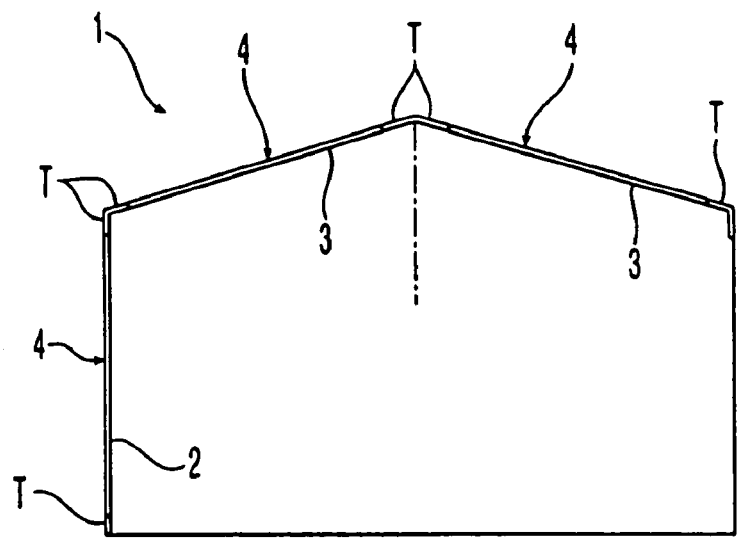
FIG. 1 is a schematic section of a generic building, equipped with an outer covering system carried out according to the teachings of the present invention.

In FIG. 1 the numeral 1 globally refers to a generic building, which is here an industrial shed. The building 1 has lateral surfaces or walls, referred to with 2, and top surfaces or pitches, referred to with 3, onto some of which covering panels carried out according to the invention, referred to with 4, are secured. The panels 4 covering the walls 2 are carried out in the same way as the panels 4 covering the pitches 3, the only difference being panel length.

As can be seen also in FIG. 2, the panels 4 are arranged one beside the other, the connection lines between them, not shown in the figure, being parallel to the height of the walls 2 of the building 1, i.e. to the inclined side of the pitches 3. The longitudinal development of the panels 4 is continuous, i.e. each panel 4 extends, depending on the circumstances, from the upper to the lower side of the corresponding lateral wall 2, or from the top to the lower edge of the corresponding pitch 3 of the roof of the building 1.

The means for carrying out the lateral sealing connection between the panels 4, as well as the means for carrying out the anchoring of said panels to the corresponding surfaces of the building 1 are not shown in the figures since their structure is known per se.

Figure 3:
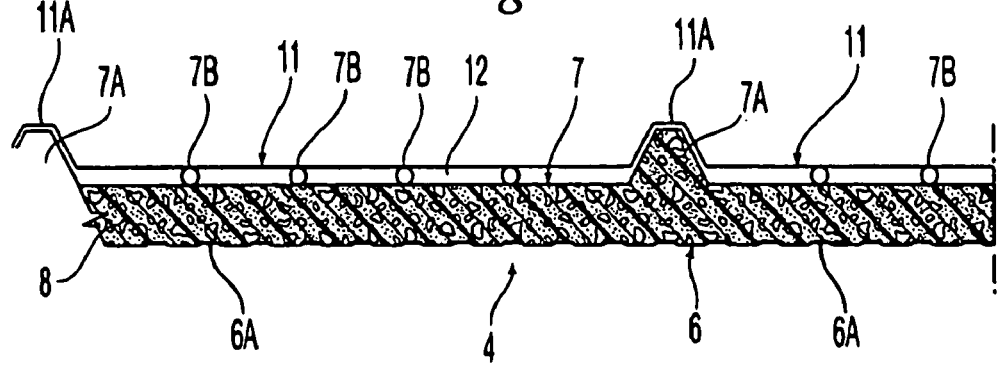
FIG. 3 is a cross section of a covering panel integrating a heat exchanger, carried out according to the teachings of the present invention.

FIG. 3 shows a section of a portion of one of the panels 4, whose structure preferably comprises a lower metal sheet 6 and an upper metal sheet 7, a foamed layer of insulating material 8 being placed between them.

The layer 8 can be carried out for instance with self-extinguishing polyurethane resin or with polyisocyanide foam or foam added with flame retarders; the gluing power of the foamed material used can be advantageously exploited in order to secure one to the other the aforesaid components 6–8 of the panel 4, so as to obtain a basically monolithic structure and thus avoid welded or mechanical connections.

Both sheets 6 and 7 can be obtained by rolling from sheet metal, for instance stainless or galvanized steel, or aluminum or copper, possibly painted or undergoing other surface treatments; the sheets 6 and 7 are corrugated, i.e. they have parallel ribs in longitudinal direction, extending basically on the whole length of said sheets.

To this purpose, when forming the lower sheet 6, parallel longitudinal ribs, identical one to the other, referred to with 6A, are defined in said sheet; similarly, when forming the upper sheet 7, first high longitudinal ribs 7A and second low longitudinal ribs 7B, are defined in said sheet. In the case shown by way of example, the high ribs 7A have a basically trapezoidal sectioned shape, whereas the low ribs 7B have a mainly circular section, where one or more ribs 7B extend between two ribs 7A in the same longitudinal direction.

According to an important feature of the present invention, the ribs 7B are designed to carry out channels, which are part of a heating system for a solar energy heat conveying fluid.

Figures 5, 6:
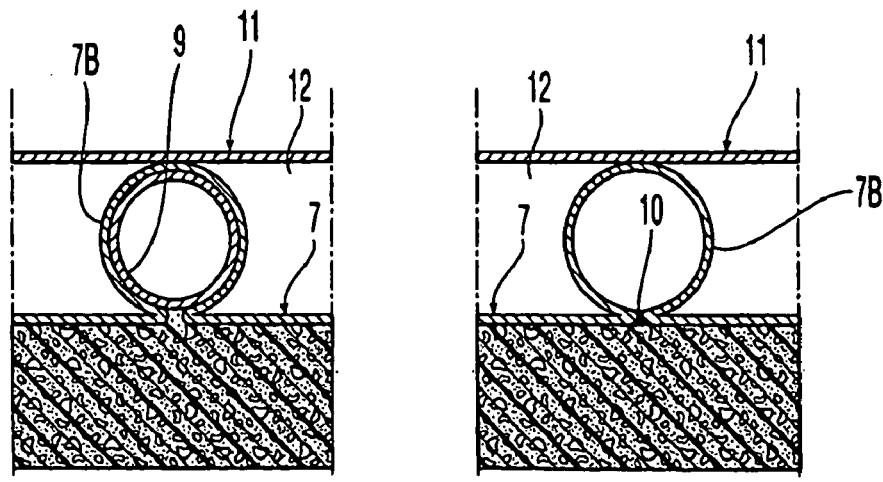
FIG. 5 is an enlarged detail of a part of FIG. 3.
FIG. 6 is an enlarged section, similar to the one in FIG. 5, of a part of a covering panel carried out according to a possible execution variant of the invention.

In the embodiment shown by way of example in FIG. 5, the ribs 7B are envisaged to this purpose to house a respective tube, preferably made of copper, referred to with 9, in which the aforesaid heat conveying fluid circulates, water for instance; as can be seen, in this case the mainly circular section of the ribs 7B has a length opening towards the insulating layer 8.

In the embodiment of the invention shown by way of example in FIG. 6, conversely, the ribs 7B are envisaged to directly carry out tubes for the heat conveying fluid. To this purpose, in the case of the embodiment of FIG. 6, the mainly circular section of the ribs 7B is almost completely closed on itself, so as to form almost completely a tube; said section is completed or sealed in the lower portion with a welding line 10, carried out longitudinally after or when forming the upper sheet 7, and before assembling the panel 4.

According to a further important feature of the invention, the upper sheet 7 defining the ribs 7A, 7B is not exposed directly to atmospheric agents, since a plate made of a transparent plastic material, such as methacrylate, carried out as known per se, is arranged onto said sheet. Said plate, referred to with 11 in FIGS. 3, 5 and 6, has continuous longitudinal seatings 11A, having a section shaped basically similarly to the high ribs 7A of the upper sheet 7, so that the said plate can be fitted onto the sheet.

Thus, between the upper sheet 7 of a panel 4 and an overlying plate 11 is defined a hollow space or chamber 12, laterally delimited by the coupling between the seatings 11A and the ribs 7A, said coupling also enabling to avoid the lateral shift of a plate 11 with respect to the underlying panel 4.

Conversely, on the longitudinal ends of each group panel 4-plate 11 it is provided for suitable headpieces or closing gaskets, schematically referred to with T in FIG. 1, which can be carried out as known per se; the aforesaid headpieces T allow each chamber 12 to be basically closed inside with respect to the outer environment.

In the case of the present invention, the outer surface of the ribs 7B is almost completely exposed to sun rays within the chamber 12, since the plate 11 is transparent and the cross section of the ribs 7B projects for more than its half, and in particular almost completely, towards the outside of the panel 4, i.e. above the flat surface of the upper sheet 7, as can be inferred for instance from FIG. 5 or 6.

In order to cover the walls 2 or the pitches 3 of the building 1, the panels 4 are mounted one beside the other, as shown in FIG. 2; as was said, the anchoring of the panels 4 with respect to the underlying surfaces 2, 3 of the building 1 can be carried out with methods and means known per se, as well as the longitudinal sealing connection between the panels (note that for said connection the upper sheet 7 of a panel 4 could extend at least partially on the upper sheet 7 of an adjacent panel). In the case of the embodiment shown in FIG. 5, the tubes 9 are already inserted into the ribs 7B.

Then, the ends of suitable hydraulic seal connections, which can be seen schematically in FIG. 4, where they are referred to with 13, are fitted onto the longitudinal ends of two adjacent ribs 7B; in the case shown by way of example the connections 13 are basically U-shaped. Similar connections are used also for the hydraulic connection of a rib 7B of a first panel 4 with a rib 7B of a second panel 4 adjacent to the first one.

As can be inferred from FIG. 2, where the ribs 7B and the connections 13 are shown schematically, all the ribs 7B and the connections 13 enable to obtain a sort of coil for the circulation of the heat conveying fluid.

Then on the panels 4 are arranged the corresponding transparent plates 11 and are mounted the closing headpieces T, the latter also acting as means for preventing the plate from longitudinally sliding and lifting with respect to the corresponding panel (note that in FIGS. 2 and 4 the transparent plates 11 and the corresponding headpieces T are not shown for reasons of clarity); as briefly mentioned above, the transversal shift of the plate 11 is prevented by the coupling seatings 11A-ribs 7A. It can be possibly provided for further fastening means, such as brackets and self-threading screws, for securing the plate 11 also in intermediate areas of the sheet 7, preferably onto the top of the ribs 7A.

The covering can eventually be completed on the lateral ends of the surface 2, 3 covered with the panels through suitable accessories, such as convenient sealing edges or gutters.

The panels 4 exploit the insulating property of the material constituting the layer 8 and use it as heat reservoir and, above all, as radiating plate for the lower area of the ducts for fluid circulation, comprising—depending on the circumstances—the tube 9 (FIG. 5) or the rib 7B closed on the bottom by the welding 10 (FIG. 6).

The insulated monolithic panel 4 is a sun ray captor, and its traditional purpose is to build a barrier against external heat so that during summer the latter is not transmitted towards the inside of the buildings and, conversely, does not get out during winter. This thermal cutting function is performed by the insulating layer 8, which is struck by the source of solar energy, either internal or external, and absorbs the latter and then dissipates it very slowly.

In the case of the present invention, the fact that the outer surface of the ribs 7B is almost completely visible, due to the transparency of the plate 11, enables to fully exploit direct solar irradiation, which allows the heat conveying fluid to warm up more rapidly. Moreover, according to a physical law heat rises upwards: therefore, both sun heat and heat coming from inside the building 1 stratify in the core of the panel 4, i.e. in the layer 8, which can thus irradiate also the lower hidden area of the duct for fluid circulation.

Thanks to the total covering of the panel 4 with the plate made of transparent plastic material 11, equipped with seatings 11A designed to be coupled precisely with the ribs 7A of the upper sheet 7, and to the following sealing of the longitudinal ends of the chamber 12 with the headpieces or gaskets T keeping air, the latter will undergo a rapid overheating due to sun rays, which contributes to a further temperature rise in the heat conveying fluid.

The description made above helps to point out the features and advantages of the present invention.

As was said, the metal sheet 7 is formed during the manufacturing step with intermediate stiffening ribs 7B, shaped so as to create suitable seatings housing the tubes 9 for fluid passage, or alternatively shaped so as to obtain during the forming step a tube-shaped section, whose lower side 10 is then welded.

The component described above is a covering panel that can be listed among traditional prefabricated modular elements, which is monolithic, light, in which the tubes in which fluid flows are not resistant and constructive elements of the cover.

The structure of the panel described above, beyond being simple and therefore economical, enables a high modularity, i.e. possibility to couple more panels one with the other so as to obtain a continuous covering surface; the manufacturing system suggested above also allows to obtain panels with different size, without causing changes to the manufacturing cycle, which can then be a continuous working cycle.

Since each panel 4 can extend, depending on the circumstances, from the upper side to the lower side of the vertical wall 2 to be covered, or from the top to the lower edge of the respective pitch 3 of a roof to be built, the number of hydraulic connections between the panels is quite small, just like the lateral connections between the panels. In said light the panels 4 can be obtained in the manufacturing process with the desired length depending on the specific needs of the final user.

The sum of the three effects referred to above (i.e. heating by direct irradiation of the sheet 7 and of the ribs 7B, heating induced by means of the insulating layer 8 and heating by means of overheated air in the chamber 12) enables to obtain an optimal efficiency for heating the heat conveying fluid.

Obviously, though the principle of the invention remains the same, construction details and embodiments can be widely varied with respect to what has been described and shown.

In the case described above the ribs 7B of the upper metal sheet 7 of the panel 4 are carried out by continuous forming of said sheet, with possible addition of the welding line 10 during said working step. However, the ribs 7B can also be carried out otherwise, for instance by molding or drawing processes or other processes involving mechanical deformation carried out on the sheet 7.

In said light, it is also evident that the development of the ribs 7B can also be other than rectilinear, i.e. in the longitudinal direction of the panel 4. For instance, the sheet 7 can be mechanically deformed so as to define a continuous rib having a winding development, like a coil; in such a case, connection elements would be envisaged only for the hydraulic connection between the continuous rib of a panel 4 and that of the adjacent panels, on the two ends of the respective channels.

The insulating material 8 could also be carried out with natural fibers, instead of being a layer of foamed material, and the lower sheet 6 could be carried out with a stiff or semi-rigid non-metallic material, for instance bituminized paper felt, fiberglass reinforced plastic or glass fibers.

The invention claimed is:

1. A covering component for protecting outer surfaces of buildings from atmospheric agents, comprising
   a first sheet (7), the first sheet being a metal sheet and designed to be exposed to sunlight,
   an insulating mass (8) placed under the first sheet (7), and
   a heat exchanger (7–9, 11, 12; 7, 8, 10–12) comprising at least a passage channel (7B), the passage channel being an integral part of the covering component (4) and being designed to be part of a solar energy heating system for a heat conveying fluid, the passage channel (7B) having an inner and an outer surface wherein said heat conveying fluid flows within said inner surface,
   characterized in that the passage channel comprises a first rib (7B) of the first sheet (7) including a cross section opening towards the insulating mass (8), the outer surface of the passage channel thus formed by the first rib (7B) being almost completely exposed to sunlight,
   wherein the first sheet extends in a longitudinal direction substantially from an upper end to a lower end of the height of a respective vertical wall (2) of a building (1), or substantially from a top edge to a lower edge of the pitch (3) of a roof (1) of the building (1)
   and wherein the heat exchanger (7–9, 11, 12; 7, 8, 10–12) further comprises a cover made of transparent material (11) arranged above the first sheet (7), allowing the first sheet (7) to be heated by direct sunlight irradiation, the cover (11) delimiting together with the first sheet (7) at least part of a hollow space (12) into which the first rib (7B) projects, such that air within the hollow space (12) is heated by exposure to sunlight, thus yielding heat to the first sheet (7) and the first rib (7B) thereof.

2. The covering component according to claim 1, characterized in that a tube (9) for the passage of the heat conveying fluid is inserted into the first rib (7B).

3. The covering component according to claim 2, characterized in that a first portion of the outer surface of the tube (9) is in contact with the inner surface of the first rib (7B), and a second portion of the outer surface of the tube (9) is in contact with the insulating mass (8), the insulating mass being part of the heat exchanger (7–9, 11, 12; 7, 8, 10–12).

4. The covering component according to claim 2, characterized in that there are provided connectors (13) for the hydraulic connection of at least two tubes (9) inserted into respective first ribs (7B) of the same covering component (4), and/or of at least a tube inserted into a respective first rib (7B) of a covering component (4), to a tube (9) inserted into a respective first rib (7B) of another covering component (4).

5. The covering component according to claim 4, characterized in that the connectors comprise connections (13) fitted into the open ends of the two tubes (9) or of the two ribs (7B) to be hydraulically connected.

6. The covering component according to claim 1, characterized in that the open portion of the cross section of the first rib (7B) is closed by a sealing or welding (10), the group comprising the first rib and its sealing or welding forming a tube for the passage of the heat conveying fluid.

7. The covering component according to claim 6, characterized in that the sealing or welding (10) is at least partly in contact with the insulating mass (8), the latter being part of the heat exchanger (7–9, 11, 12; 7, 8, 10–12).

8. The covering component according to claim 6, characterized in that there are provided connectors (13) for the hydraulic connection of at least two first ribs (7B) of the same covering component (4), and/or of at least a first rib (7B) of a covering component (4), to a first rib (7B) of another covering component (4).

9. The covering component according to claim 1, characterized in that the cross section of the rib (7B) is mainly circular.

10. The covering component according to claim 1, characterized in that the first sheet (7) rests on the insulating mass (8) and/or is in contact with the insulating mass.

11. The covering component according to claim 1, further comprising a second sheet made of stiff or semi-rigid material (6), the insulating mass being placed between the first sheet and second sheet (7, 6).

12. The covering component according to claim 11, characterized in that the second sheet (6) is carried out with a metallic material, or with bituminized paper felt, fiberglass reinforced plastic or glass fibers.

13. The covering component according to claim 11, characterized in that gluing power of the material constituting the insulating mass (8) allows to secure onto the latter the first sheet and/or the second sheet (7, 6).

14. The covering component according to claim 1, characterized in that the insulating mass (8) is made of self-extinguishing polyurethane material, or of polyisocyanide foam or foam added with flame retarders, or of mineral fibers.

15. The covering component according to claim 1, characterized in that at least the first sheet (7) is formed by copper.

16. The covering component according to claim 15, characterized in that the covering component (4) is designed to be longitudinally placed beside and/or coupled with a similar covering component (4), the connection line between the two components placed side by side being substantially parallel to the height of a vertical wall (2) of a building (1), or to the oblique side of the pitch (3) of a building roof.

17. The covering component according to claim 15, characterized in that the first rib (7B) extends in the same longitudinal direction as the covering component (4) or as the first sheet (7).

18. The covering component according to claim 1, characterized in that the first rib (7B) extends substantially on the whole length of the covering component (4) or of the first sheet (7).

19. The covering component according to claim 1, characterized in that the first sheet (7) defines one or more second ribs (7A) for positioning the cover (11).

20. The covering component according to claim 19, characterized in that two or more first ribs (7B) are placed between two second ribs (7A).

21. The covering component according to claim 19, characterized in that the first rib (7B) extends in the same longitudinal direction as the covering component (4) or as the first sheet (7), and the second rib or ribs (7A) extend in the same longitudinal direction as the first rib (7B).

22. The covering component according to claim 21, characterized in that the cover (11) comprises a plate (11) having one or more continuous longitudinal seatings (11A) for the coupling with a corresponding second rib (7A).

23. The covering component according to claim 1, characterized in that a plurality of first ribs (7B) are provided in the first sheet.

24. The covering component according to claim 23, characterized in that the first ribs (7B) extend substantially parallel one to the other, in the longitudinal direction of the covering component (4) or of the first sheet (7).

25. The covering component according to claim 1, characterized in that lateral closing pieces (T) for the hollow space (12) are provided.

26. The covering component according to claim 25, characterized in that the closing pieces comprise two continuous longitudinal seatings (11A), wherein each continuous longitudinal seating is coupled with a second rib (7A) which corresponds to said continuous longitudinal seating.

27. The covering component according to claim 25, characterized in that the closing pieces comprise headpieces or gaskets placed on the two longitudinal ends of the covering component (4).

28. The covering component according to claim 1, characterized in that the cover (11) or plate (11) is made of transparent plastic material.

29. A covering component for protecting outer surfaces of building from atmospheric agents, comprising:
a first sheet (7), the first sheet being a metal sheet and designed to be exposed to sunlight,
an insulating mass (8) place under the first sheet (7), and
a heat exchanger (7–9, 11, 12; 7, 8, 10–12) comprising at least a passage channel (7B), the passage channel being an integral part of the covering component (4) and being designed to be part of a solar energy heating system for a heat conveying fluid, the passage channel (7B) having an inner and outer surface, wherein said heat conveying fluid flows within said inner surface,
characterized in that the passage channel comprises a first rib (7B) of the first sheet (7) including a cross section opening towards the insulating mass (8), the outer surface of the passage channel thus formed by the first rib (7B) being almost completely exposed to sunlight,
wherein the first sheet extends in a longitudinal direction substantially from an upper end to a lower end of the height of a respective vertical wall (2) of a building (1), or substantially from a top edge to a lower edge of the pitch (3) of a roof (1) of the building (1),
wherein the open portion of the cross section of the first rib (7B) is closed by a sealing or welding (10), the first rib and the sealing or welding forming a tube for the passage of the heat conveying fluid, and wherein there are provided connectors (13) for hydraulic connection of at least two first ribs (7B) of a same covering component (4), and/or of at least a first rib (7B) of a covering component (4) to a first rib (7B) of another covering component (4).

30. The covering component according to claim 29, characterized in that the connectors comprise connections fitted into the open ends of the two first ribs to be hydraulically connected.

31. A covering component for protecting outer surfaces of buildings from atmospheric agents, comprising:
a first sheet (7), the first sheet being a metal sheet and designed to be exposed to sunlight,
an insulating mass (8) place under the first sheet (7), and
a heat exchanger (7–9, 11, 12; 7, 8, 10–12) comprising at least a passage channel (7B), the passage channel being an integral part of the covering component (4) and being designed to be part of a solar energy heating system for a heat conveying fluid, the passage channel (7B) having an inner and outer surface, wherein said heat conveying fluid flows within said inner surface,
characterized in that the passage channel comprises a first rib (7B) of the first sheet (7) including a cross section opening towards the insulating mass (8), the outer surface of the passage channel thus formed by the first rib (7B) being almost completely exposed to sunlight,
wherein the first sheet extends in a longitudinal direction substantially from an upper end to a lower end of the height of a respective vertical wall (2) of a building (1), or substantially from a top edge to a lower edge of the pitch (3) of a roof (1) of the building (1),
and wherein a tube (9) for the passage of the heat conveying fluid is inserted into the first rib (7B).

32. A covering component for protecting outer surfaces of buildings from atmospheric agents, comprising:
a first sheet, the first sheet being a metal sheet and designed to be exposed to sunlight, such that the first sheet can be heated by direct sunlight irradiation,
an insulating mass placed under the first sheet, and
a heat exchanger comprising at least a passage channel, the passage channel being an integral part of the covering component and being designed to be part of a solar energy heating system for a heat conveying fluid,
characterized in that the passage channel comprises a first rib of the first sheet and a tube for the passage of the heat conveying fluid, the tube being positioned in the first rib and in contact thereto, such that the first sheet can yield heat to the tube,
wherein the first sheet extends in a longitudinal direction substantially from an upper end to a lower end of the height of a respective vertical wall of a building, or substantially from a top edge to a lower edge of the pitch of a roof of the building and wherein the heat exchanger further comprises a cover made of transparent material arranged above the first sheet, the cover delimiting together with the first sheet at least part of a hollow space, such that air within the hollow space is heated by exposure to sunlight and can yield further heat to the first sheet and the tube.

33. A covering component for protecting outer surfaces of building from atmospheric agents, comprising:
a first sheet, the first sheet being a metal sheet and designed to be exposed to sunlight, such that the first sheet can be heated by direct sunlight irradiation;
an insulating mass placed under the first sheet, and
a heat exchanger comprising at least a passage channel, the passage channel being an integral part of the covering component and being designed to be part of a solar energy heating system for a heat conveying fluid,
wherein the passage channel comprises a tube for the passage of the heat conveying fluid, said tube extending longitudinally above the insulating mass and in contact with the first sheet, such that the first sheet can yield heat to the tube,
wherein the first sheet extends in a respective longitudinal direction substantially from an upper end to a lower end of the height of a vertical wall of a building, or substantially from a top edge to a lower edge of the pitch of a roof of the building, and wherein the heat exchanger further comprises a cover made of transparent material arranged above the first sheet, allowing the first sheet to be heated by direct sunlight irradiation, the cover delimiting together with the first sheet at least part of a hollow space, such that air within the hollow space is heated by exposure to sunlight and can yield further heat to the first sheet and the tube.

* * * * *